United States Patent
Baba (10) Patent No.: US 10,438,489 B2
(45) Date of Patent: Oct. 8, 2019

(54) OBJECT DETECTION METHOD AND APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 84 days.

(21) Appl. No.: 15/855,803

(22) Filed: Dec. 27, 2017

(65) Prior Publication Data
US 2018/0182243 A1 Jun. 28, 2018

(30) Foreign Application Priority Data

Dec. 27, 2016 (JP) .................................. 2016-253504

(51) Int. Cl.
| | |
|---|---|
| G06F 3/00 | (2006.01) |
| G08G 1/16 | (2006.01) |
| G06K 9/00 | (2006.01) |
| G01S 13/93 | (2006.01) |
| G01S 13/86 | (2006.01) |
| G06K 9/32 | (2006.01) |
| G06K 9/62 | (2006.01) |
| G06T 7/00 | (2017.01) |

(52) U.S. Cl.
CPC .............. *G08G 1/16* (2013.01); *G01S 13/867* (2013.01); *G01S 13/931* (2013.01); *G06K 9/00805* (2013.01); *G06K 9/3233* (2013.01); *G06K 9/6202* (2013.01); *G06K 9/629* (2013.01); *G08G 1/166* (2013.01); *G01S 2013/935* (2013.01); *G01S 2013/9346* (2013.01); *G01S 2013/9364* (2013.01); *G01S 2013/9367* (2013.01)

(58) Field of Classification Search
CPC .................................... G06K 9/00; G06T 7/00
USPC ......................................................... 382/103
See application file for complete search history.

(56) References Cited

U.S. PATENT DOCUMENTS

| | | | | |
|---|---|---|---|---|
| 2014/0139369 A1* | 5/2014 | Baba | ..................... | G01S 13/867 342/146 |
| 2014/0294123 A1* | 10/2014 | Khoshgard | ......... | H04L 25/0232 375/340 |
| 2017/0294123 A1 | 10/2017 | Baba | | |

FOREIGN PATENT DOCUMENTS

JP 2016-223889 12/2016

\* cited by examiner

*Primary Examiner* — Abolfazl Tabatabai
(74) *Attorney, Agent, or Firm* — Knobbe, Martens, Olson & Bear, LLP (57) ABSTRACT

In an object detection apparatus, a first association unit associates, based on radar information and camera information, radar objects with at least one camera object that are estimated to be the same as each other. If camera objects are detected so that the camera information includes at least the detection point and the type of each of the camera objects, a determination unit determines whether the camera objects express a common object in accordance with the camera information. A second association unit defines, upon determination that the camera objects express the common object, the camera objects as a camera object group, and associates, if one of the camera objects constituting the camera object group is associated with a target radar object that is one of the radar objects, all the camera objects constituting the camera object group with the target radar object.

9 Claims, 6 Drawing Sheets

$\Delta R = |R1 - R2|$
$\Delta \theta = |\theta 1 - \theta 2|$
$\Delta W = |W1 - W2|$

OBJECT DETECTION METHOD AND APPARATUS

CROSS REFERENCE TO RELATED APPLICATIONS

This application is based on and claims the benefit of priority from Japanese Patent Application 2016-253504 filed on Dec. 27, 2016, the disclosure of which is incorporated in its entirety herein by reference.

TECHNICAL FIELD

The present disclosure relates to technology for detecting objects using a radar apparatus and a camera.

BACKGROUND

A collision avoidance system for a vehicle is required to accurately detect targets such as other vehicles, pedestrians, etc. From this viewpoint, there is a technology that uses both a radar apparatus and a camera for detecting targets.

For example, the technology described in Japanese Patent Application Publication No. 2014-122873, which will be referred to as PTL, determines whether an object detected based on an image captured by a camera (hereinafter referred to as a camera object) and an object detected by a radar apparatus (hereinafter referred to as a radar object) are the same as each other.

Specifically, this technology sets a radar-object region that contains a detected point of a radar object and a margin around the detected point; the margin is based on detection errors. The technology also sets a camera-object region that contains a detected point of a camera object and a margin around the detected point; the margin is based on detection errors. The technology determines that the radar object and the camera object are identical to each other if the radar-object region and the camera-object region mutually overlap with each other.

SUMMARY

The radar-object regions of radar objects and the camera-object regions of camera objects may not necessarily overlap with one another in a one-to-one relationship. If a radar-object region overlaps with a first camera-object region including a first camera object and a second camera object region including a second camera object, the technology of PTL fails to disclose which of the first pair of the radar-object region and the first camera-object region and the second pair of the radar-object region and the second camera-object region is determined as an identical-object pair.

In such a case, let us consider an approach that determines whether the first minimum distance between the detected point of the radar-object region and the detected point of the first camera-object region is shorter than the second minimum distance between the detected point of the radar-object region and the detected point of the second camera-object region. If the first minimum distance between the detected point of the radar-object region and the detected point of the first camera-object region is shorter than the second minimum distance between the detected point of the radar-object region and the detected point of the second camera-object region, this approach determines that the radar object based on the radar-object region and the camera object based on the first camera-object region are the same object.

This approach however may have the following issue. Image recognition processing based on images captured by a camera may recognize a single real object as a first camera object, such as a cyclist, and a second camera object, such as a pedestrian, at almost the same position in a captured image. In this case, as described above, the approach selects one of the first camera object and the second camera object, which is identical to the radar object. This may result in information about the other of the first and second camera objects, in particular the type of the other of the first and second camera objects, being lost.

From this viewpoint, the present disclosure seeks to provide technologies, each of which is capable of holding information about the other of first and second camera objects if a radar object and one of the first and second camera objects are determined as the same object.

According to a first exemplary aspect of the present disclosure, there is provided an object detection apparatus. The object detection apparatus includes a first acquisition section configured to acquire radar information that includes at least respective detection points of radar objects. The radar objects are objects detected by a radar sensor based on a detection range. The object detection apparatus includes a second acquisition unit configured to perform a comparing task to compare, based on an image captured by a camera that has a capture range which overlaps at least a part of the detection range of the radar sensor, predetermined feature quantities extracted from the image with feature quantity templates. The second acquisition unit is configured to detect, based on a result of the comparison task, at least one object as a camera object, the feature quantity templates having been prepared beforehand for each of respective types of object to be detected. The second acquisition unit is configured to acquire camera information that includes at least a detection point and type of the at least one camera object.

The object detection apparatus includes a first association unit configured to associate, based on the radar information and the camera information, at least one of the radar objects with the at least one camera object upon determination that the at least one of the radar objects is estimated to be identical to the at least one camera object. The object detection apparatus includes a determination unit configured to, if a plurality of camera objects are detected so that the camera information includes at least the detection point and the type of each of the camera objects, determine whether the camera objects express a common object in accordance with the camera information. The object detection apparatus includes a second association unit configured to:

(1) Define, upon determination that the camera objects are the common object, the camera objects as a camera object group (2) Associate, if one of the camera objects constituting the camera object group is associated with a target radar object that is one of the radar objects, all the camera objects constituting the camera object group with the target radar object.

According to a second exemplary aspect of the present disclosure, there is provided an object detection apparatus. The object detection apparatus includes a first acquisition section configured to acquire radar information that includes at least respective detection points of radar objects. The radar objects are objects detected by a radar sensor based on a detection range. The object detection apparatus includes a second acquisition unit configured to perform a comparing task to compare, based on an image captured by a camera that has a capture range which overlaps at least a part of the detection range of the radar sensor, predetermined feature quantities extracted from the image with feature quantity templates. The second acquisition unit is configured to detect, based on a result of the comparison task, objects as camera objects, the feature quantity templates having been prepared beforehand for each of respective types of object to be detected. The second acquisition is configured to acquire camera information that includes at least a detection point and type of each of the camera objects. The object detection apparatus includes a determination unit configured to determine whether the camera objects express a common object in accordance with the camera information. The object detection apparatus includes an association unit configured to:

1. Define, upon determination that the camera objects express a common object, the camera objects as a camera object group 2. Estimate, based on the radar information and the camera information, whether at least one of the radar objects and at least one of the camera objects are identical to each other 3. Upon determination that the camera objects express the camera object group and that a candidate camera object that is one of the camera objects and a selected one of the radar objects have been estimated to be identical to each other, associate all the camera objects constituting the camera object group with the selected one of the radar objects.

According to a third exemplary aspect of the present disclosure, there is provided an object detection method. The object detection method includes acquiring radar information that includes at least respective detection points of radar objects. The radar objects are objects detected by a radar sensor based on a detection range. The object detection method includes performing a comparing task to compare, based on an image captured by a camera that has a capture range which overlaps at least a part of the detection range of the radar sensor, predetermined feature quantities extracted from the image with feature quantity templates. The object detection method includes detecting, based on a result of the comparison task, at least one object as a camera object, the feature quantity templates having been prepared beforehand for each of respective types of object to be detected. The object detection method includes acquiring camera information that includes at least a detection point and type of the at least one camera object. The object detection method includes associating, based on the radar information and the camera information, at least one of the radar objects with the at least one camera object upon determination that the at least one of the radar objects is estimated to be identical to the at least one camera object. The object detection method includes determining, if a plurality of camera objects are detected so that the camera information including at least the detection point and the type of each of the camera objects, whether the camera objects express a common object in accordance with the camera information. The object detection method includes defining, upon determination that the camera objects are the common object, the camera objects as a camera object group. The object detection method includes associating, if one of the camera objects constituting the camera object group is associated with a target radar object that is one of the radar objects, all the camera objects constituting the camera object group with the target radar object.

Each of the object detection apparatus and method according to the first, second, and third exemplary aspects enables a radar object to be associated with a plurality of camera objects that express a common object. This results in reduction of loss of attribute information concerning the camera objects, and in particular, results in reduction of loss of information expressing the types of objects.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes a present embodiment of the present disclosure with reference to the accompanying drawings.

1. Configuration

Figure 1:
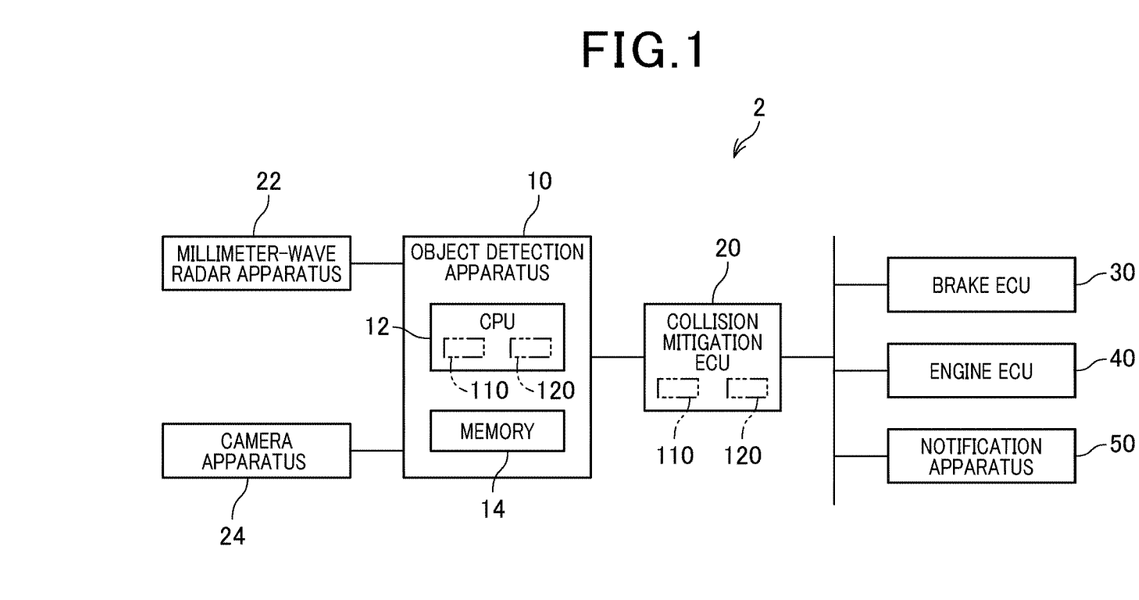
FIG. 1 is a block diagram schematically illustrating an example of the configuration of a collision mitigation system.

A collision mitigation system 2 shown in FIG. 1 is installed in a vehicle such as a passenger car, and includes a collision mitigation electronic control unit (ECU) 20, a millimeter-wave radar apparatus 22, a camera apparatus 24, a brake ECU 30, an engine ECU 40, and a notification apparatus 50.

The object detection apparatus 10 is connected for communication with the millimeter-wave radar apparatus 22, the camera apparatus 24 and the collision mitigation ECU 20. The collision mitigation ECU 20 is connected for communication with the object detection apparatus 10, the brake ECU 30, the engine ECU 40 and the notification apparatus 50. The configuration for executing communications is not limited to any specific type.

The millimeter-wave radar apparatus 22 is a radar apparatus for detecting other vehicles and detecting objects which are not other vehicles, such as pedestrians, etc., using millimeter-band waves. The millimeter-wave radar apparatus 22 is mounted for example at the center of the front grille of the vehicle in which the collision mitigation system 2 is installed, with that vehicle being referred to herein as the host vehicle. The millimeter-wave radar apparatus 22 emits millimeter-band waves that scan within a horizontal plane ahead of the host vehicle, and sends transmit/receive data, obtained by receiving reflected millimeter-band waves, to the object detection apparatus 10 as detection information.

The camera apparatus 24 is equipped with a single CCD camera whose type is known as a single-lens camera. The camera apparatus 24 is mounted for example within the passenger compartment of the host vehicle, attached near the center of the windshield mirror. The camera apparatus 24 transmits images captured by the CCD camera to the object detection apparatus 10, as image signals.

The brake ECU 30 is equipped with a CPU, ROM, RAM, etc., and controls braking of the host vehicle. Specifically, the brake ECU 30 controls a brake actuator (ACT), installed in the host vehicle, which opens and closes a pressure increase control valve and a pressure decrease control valve that are installed in a brake hydraulic circuit installed in the host vehicle. For example, the ECU 30 performs control of the brake ACT in accordance with a value indicative of the degree of depression of the brake pedal; the value of the degree of depression of the brake pedal is measured by a brake pedal sensor installed in the host vehicle.

Furthermore, in accordance with commands from the collision mitigation ECU 20, the brake ECU 30 controls the brake ACT to thereby increase the braking force of the host vehicle.

The engine ECU 40 is equipped with a CPU, ROM, RAM, etc., and controls starting and stopping of an internal, combustion engine, referred to simply as an engine, of the host vehicle, fuel injection amounts, ignition timings, etc.

Specifically, the engine ECU 40 controls the throttle ACT which is an actuator for opening/closing a throttle valve that is provided in an air intake passage of the engine, in accordance with a value indicative of the degree of depression of the actuator pedal. The value of the degree of depression of the actuator pedal is measured by an actuator pedal sensor installed in the host vehicle. The engine ECU 40 also controls the throttle ACT to thereby reduce the drive power of the engine, in accordance with commands from the collision mitigation ECU 20.

When receiving a warning signal from the collision mitigation ECU 20, the collision mitigation ECU 20 notifies the driver of the vehicle, by sounds and lights, etc.

The collision mitigation ECU 20 is equipped with a CPU, ROM, RAM, etc., and executes collision mitigation control.

Specifically, based on information concerning objects detected by the object detection apparatus 10, the collision mitigation ECU 20 outputs various commands to the brake ECU 30, the engine ECU 40, and the notification apparatus 50.

For example, the collision mitigation ECU 20 determines whether there is a possibility of the host vehicle colliding with an object that is detected by the object detection apparatus 10.

Upon determination that there is a possibility of the host vehicle colliding with an object, the collision mitigation ECU 20 transmits a warning signal to the notification apparatus 50, for notifying the vehicle driver. Furthermore, upon determination that there is a high probability of the host vehicle colliding with an object, the collision mitigation ECU 20 notifies the engine ECU 40 to reduce the drive power of the engine, and transmits a command to the brake ECU 30 for increasing the braking force of the host vehicle. Because these control tasks upon determination that there is a possibility or a high probability of the host vehicle colliding with an object are well known, detailed descriptions of them are omitted herein.

The object detection apparatus 10 is centered on a known type of microcomputer, equipped with a CPU 12 and a memory 14 comprised of at least a ROM, a RAM, and/or a semiconductor memory such as a flash memory. The various functions of the object detection apparatus 10 are implemented by the CPU 12 in executing programs that are stored in non-transitory recording media. With this embodiment, the memory 14 corresponds to the non-transitory recording media in which the programs are stored. Furthermore, the CPU 12 executes the programs, thus executing methods corresponding to the programs. The object detection apparatus 10 is not necessarily configured with a single microcomputer, and it would be equally possible to have a plurality of microcomputers. The object detection apparatus 10 executes at least an information acquisition routine and an object detection routine. The method of implementing the object detection routine is not necessarily limited to being based on software, and it would be equally possible for all or part of the routine to be realized by using one or more hardware elements. For example, in a case in which the above functions are realized through use of hardware comprised of electronic circuitry, the electronic circuitry could be implemented as a digital circuit containing a plurality of logic circuits, or as analog circuits, or as a combination of these.

2. Processing

The following describes the information acquisition routine and object detection routine executed by the object detection apparatus 10.

The object detection apparatus 10 carries out the information acquisition routine every predetermined interval to thereby obtain a radar signal from the millimeter-wave radar apparatus 22 and an image signal from the camera apparatus 24, and store the radar signal and image signal in a prescribed region that is provided in the memory 14.

Figure 2:
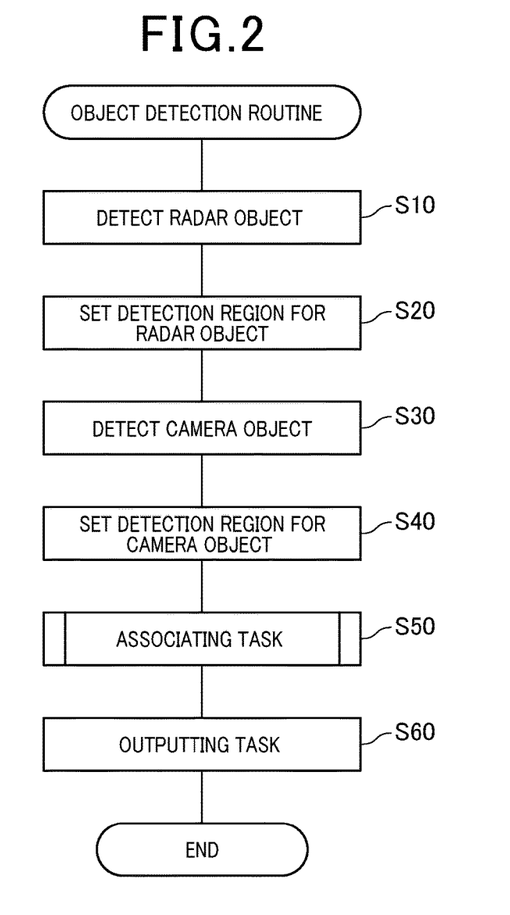
FIG. 2 is a flowchart schematically illustrating an object detection routine.

The following describes the details of the object detection routine with reference to the flowchart of FIG. 2.

[2-1. Object Detection Routine]

The object detection apparatus 10 repetitively executes the object detection routine each time a radar signal and an image signal are obtained by the information acquisition routine.

In step S10, based on a radar signal from the millimeter-wave radar apparatus 22, the object detection apparatus 10 generates information (hereinafter referred to as radar information) relating to objects (hereinafter referred to as radar objects) from which radar waves have been reflected, through use of a known method of millimeter-wave radar operation. Specifically, the radar information about a radar object includes at least the direct distance R from the host vehicle to the radar object, the azimuth θr of the radar object as measured with reference to the advancement direction of the host vehicle, and the relative speed Vr of the radar object with respect to the host vehicle.

Figure 3:
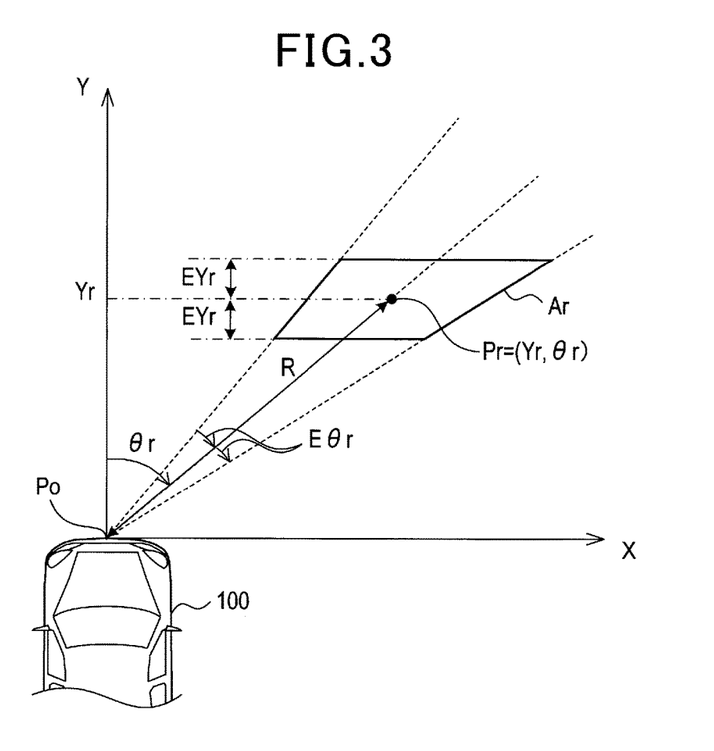
FIG. 3 is an explanatory diagram relating to detection regions.

Furthermore, based on the direct distance R and azimuth θr, the object detection apparatus 10 calculates the position coordinates of the radar object in an XY plane as the detection point Pr of the radar object. The coordinates of the detection point Pr are expressed as (Yr, θr). As shown in FIG. 3, the XY plane is defined by an X-axis that is oriented along a lateral direction that is the width direction of the host vehicle (see reference numeral 100), and a Y-axis that is oriented along the travel direction of the host vehicle 100.

The tip position of the host vehicle, at which the millimeter-wave radar apparatus 22 is mounted, is set as the reference point Po in the XY plane, and the position of the detection point Pr is expressed relative to the reference point Po. Yr is the Y-coordinate of the detection point Pr, and is obtained as Yr=R·cos θr. It is also possible to calculate the ground speed of the radar object, from the relative speed Vr and the speed of the host vehicle. In that way, the coordinates of the detection point Pr and also the ground speed Vr of the radar object can be contained in the radar information. FIG. 3 shows an example in which a radar object is positioned ahead and to the right of the host vehicle.

In step S20, the object detection apparatus 10 sets a detection region Ar having as its center the detection point Pr of the radar object that was detected in step S10. Specifically, the detection region Ar has a width that is an assumed error amount, set with reference to the detection point Pr of the radar object, where the assumed error amount has been set beforehand based on the characteristics of the millimeter-wave radar apparatus 22.

For example assuming that the estimated error of the Y-coordinate is ±Eyr and the estimated error of the azimuth angle is ±Eθr, then the Y coordinate Y and the azimuth angle θ of the detection region Ar is expressed by the following equations:

$$Yr-Eyr \leq Y \leq Yr+Eyr$$

$$\theta r-E\theta r \leq \theta \leq \theta r+E\theta r$$

That is to say, the detection region Ar has a trapezoidal shape, which becomes increasingly wider in the horizontal direction, i.e. vehicle width direction, in accordance with increase of distance from the host vehicle.

In step S30, the object detection apparatus 10 detects objects based on a captured image from the camera apparatus 24, and generates information (hereinafter referred to as a camera information) relating to the detected objects (hereinafter referred to as a camera objects).

Specifically, the object detection apparatus 10 uses an object model dictionary that has been stored beforehand in the memory 14. The object model dictionary includes object models, i.e. feature quantity templates, provided for each of respective types of object, such as vehicles, pedestrians, cyclists, etc.

That is, the CPU 12 reads, from the memory 14, the feature quantity templates for each of the respective types of objects, and executes pattern matching processing between the feature quantity templates and the captured image. Hence a camera object, which is a body detected by the pattern matching processing, has information expressing the type of object, as one part of the camera information for that camera object.

The object detection apparatus 10 obtains the Y-coordinate Yc of an object in the above-mentioned XY plane based on the position of the object with respect to the top-bottom direction in the captured image. In addition, the object detection apparatus 10 obtains the azimuth angle θc of the object based on the position of the object with respect to the left-to-right direction in the captured image, with the straight-ahead direction of the host vehicle as reference.

The coordinates (Yc, θc) of the detection point Pc of the camera object are thereby specified. The object width Wc, expressing the size of the camera object in the lateral direction, is obtained from the size of the detected camera object in the captured image. Methods of obtaining the position and size of an object that appears in an image are well known, and hence detailed descriptions of the methods are omitted.

Figure 4:
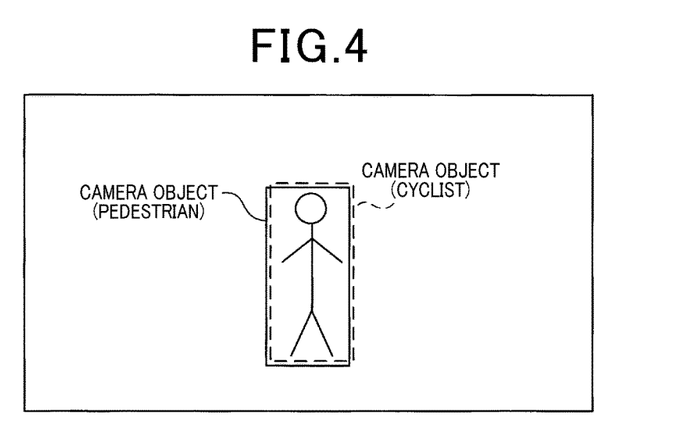
FIG. 4 is an explanatory diagram relating to a plurality of camera objects that are detected based on a single real object.

With detection using such a type of pattern matching processing, there are cases in which camera objects are detected for respectively different objects, which are of different type but are of similar shape. For example, a cyclist and a pedestrian who are each approaching from ahead will have similar external shapes. Hence, as shown in FIG. 4, there may be a camera object that is detected as a pedestrian, and another camera object that is detected as a cyclist, with their respective positions being substantially the same.

In step S40, for each of the respective camera objects that were detected in step S30, the object detection apparatus 10 uses the same procedure as described for step S20 to thereby set a detection region Ac having a detection point Pc as center. In particular, the object detection apparatus 10 uses, as the estimated errors Eyc and θc used in setting the detection region Ac, values previously determined based on the characteristics of the camera apparatus 24.

In step S50, the object detection apparatus 10 executes an associating task based on a radar object detected by the millimeter-wave radar apparatus 22 and camera objects detected by the camera apparatus 24 to thereby associate a radar object and a camera object as the same object if determining that the radar object and camera object are the same object. The details of this associating task are described later.

In step S60, the object detection apparatus 10 outputs, to the collision mitigation ECU 20, the detection results including the positions of the detected objects and the types of the objects, and thereafter, terminates the object detection routine.

[2-2. Associating Task]

Figure 5:
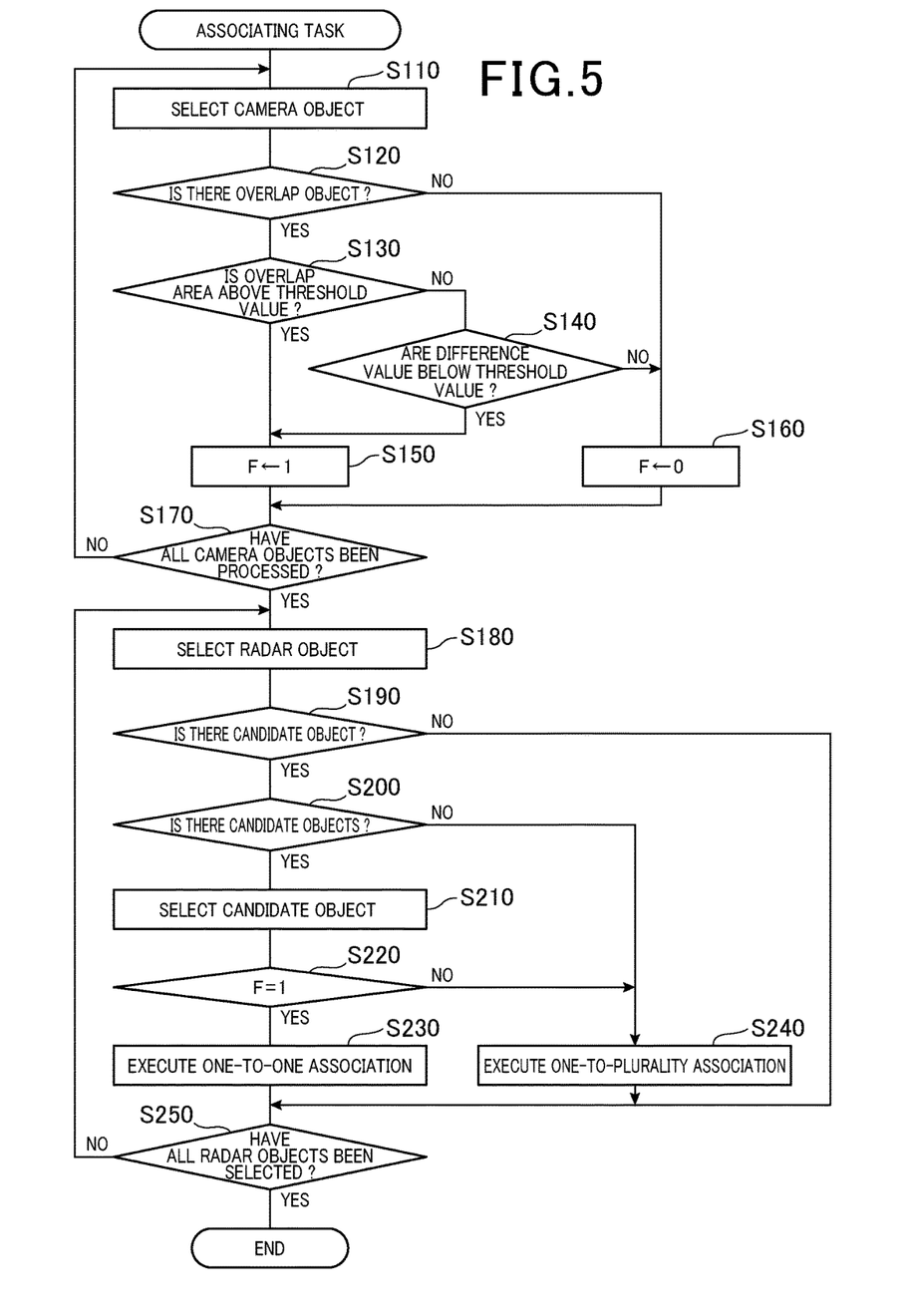
FIG. 5 is a flowchart schematically illustrating an associating task included in the object detection routine.

The following describes the details of the associating task executed in step S20 of FIG. 2 using the flowchart of FIG. 5.

In step S110, the object detection apparatus 10 selects one of the camera objects that have been detected in step S130. In the following such a selected camera object will referred to as a selected object.

In step S120, the object detection apparatus 10 determines whether there is at least one other detected camera object, which has a detection region overlapping the detection region of the selected object. If there is at least one other camera object (referred to the in following as an overlap object), the associating task proceeds to step S130, while if there is no overlap objects, the associating task proceeds to step S160.

Figure 6:
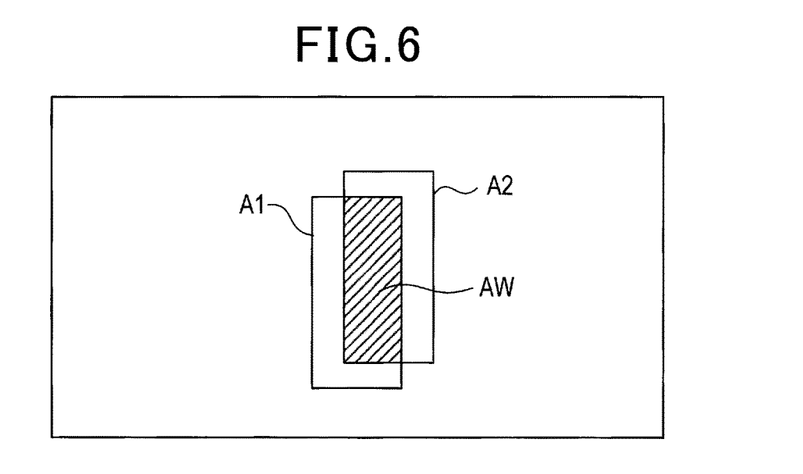
FIG. 6 is an explanatory diagram relating to overlapping regions.

In step S130, the object detection apparatus 10 determines whether the area of an overlap region exceeds a predetermined area threshold value; the overlap region represents the region of overlap between the respective detection regions of the selected object and the overlap object. If the area of the overlap region, which will be referred to as an overlap area, exceeds the area threshold value, the associating task proceeds to step S150, while if the area threshold value is not exceeded, step S140 is then executed. Note that FIG. 6 is a diagram illustrating a selected object A1, an overlap object A2 and the overlap region AW.

In step S140, the object detection apparatus 10 determines whether a difference value between the selected object and the overlap object is less than a predetermined correlation threshold value. If the difference value is less than the correlation threshold value then the associating task proceeds to step S150, while if the difference value is equal to or greater than the correlation threshold value, the associating task proceeds to step S160.

The term "difference value" is a generic name applied to a distance difference ΔR, an azimuth difference Δθ, and an object width difference ΔW. For example, the object detection apparatus 10 can perform affirmative determination (YES determination) in step S140 upon determining that each of Δ R, Δθ, and ΔW is less than an individually set correlation threshold value. Alternatively, the object detection apparatus 10 can perform affirmative determination upon determining that any one, or any pair of ΔR, Δθ, and ΔW is less than its individually set correlation threshold value. Furthermore, instead of using all three of these difference values, the object detection apparatus 10 can perform the determination operation in step S140 using only one of the difference values, or only two of the difference values.

Figure 7:
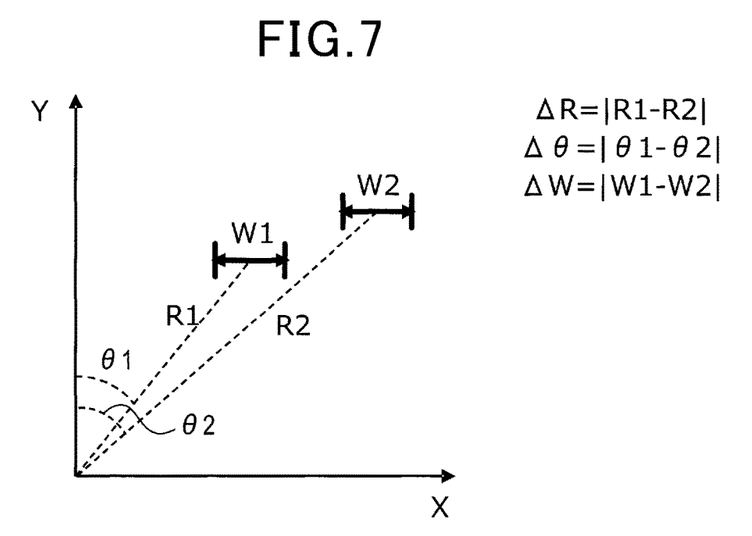
FIG. 7 is an explanatory diagram relating to difference values.

Specifically as shown in FIG. 7, the object detection apparatus 10 uses the distance, azimuth and object width as judgement-use information items. That is, the object detection apparatus 10 uses, as the distance difference ΔR, the absolute value |R1−R2| of difference between the distance R1 to the selected object and the distance R2 to the overlap object. The object detection apparatus 10 also uses, as the azimuth difference Δθ, the absolute value |θ1−θ2| of difference between the azimuth θ1 of the selected object and the azimuth θ2 of the overlap object. The object detection apparatus 10 further uses, as the object width difference ΔW, the absolute value |W1−W2| of difference between the object width W1 of the selected object and the object width W2 of the overlap object.

In step S150, the object detection apparatus 10 determines that the selected object and the overlap object are the same object, thus setting a same-object flag F, which is for example stored in the memory 14 as same-object determination information, of the selected object to 1. In step S150, the object detection apparatus 10 also stores, in the memory 14, information representing that the selected object and the overlap object constitute a same camera object group. The associating task thereafter proceeds to step S170.

In step S160, the object detection apparatus 10 determines that the selected object and the overlap object are not the same object, thus setting the same-object flag F of the selected object 0. The associating task thereafter proceeds to step S170.

In step S170, the object detection apparatus 10 determines whether the processing of steps S110~S160 above has been completed for all of the camera objects detected in step S30. If any camera objects remain to be processed, then the associating task returns to step S110, while if all of the camera objects have been processed, the associating task proceeds to step S180.

In step S180, the object detection apparatus 10 selects one of the radar objects that were detected in step S110. The selected radar object is hereinafter referred to as a target object.

In step S190, the object detection apparatus 10 determines whether there is a camera object (hereinafter referred to as a candidate object) whose detection region overlaps the detection range of the target object.

Upon determination that there is a candidate object (YES in step S190), the associating task proceeds to step S200. Otherwise, upon determination that there is no candidate object, the object detection apparatus 10 determines that there is no camera object that is the same as the target object. Then, the associating task proceeds to step S250.

In step S200, the object detection apparatus 10 determines whether there is a plurality of candidate objects. If there is a plurality of candidate objects, the associating task proceeds to step S210, while if there is only a single candidate object, the associating task proceeds to step S240.

In step S210, the object detection apparatus 10 selects one of the plurality of candidate objects. Specifically, the object detection apparatus 10 can select, from the plurality of candidate objects, the candidate object whose detection region has a largest amount of overlap with the detection region of the target object. Alternatively, the object detection apparatus 10 can select, from the plurality of candidate objects, the candidate object having the smallest distance between the detection point of the candidate object and the detection point of the target object. The present disclosure is not limited to these ways of selection, and the object detection apparatus 10 can perform the selection based on collective consideration of a plurality of factors. The selected candidate object is hereinafter referred to as a selected object.

In step S220, the object detection apparatus 10 determines whether the same-object flag F that has been set for the selected object is equal to 1. If the same-object flag F is set to 1, the associating task proceeds to step S230, while if the same-object flag F is set to 0, the associating task proceeds to step S240.

In step S230, the object detection apparatus 10 effects a one-to-plurality association designating that the target object (that is, a radar object), and the camera object group to which the selected object belongs, are the same object. The associating task thereafter proceeds to step S250.

In step S240, the object detection apparatus 10 effects a one-to-one association designating that the target object and the selected object are the same object. The associating task thereafter proceeds to step S250.

In step S250, the object detection apparatus 10 determines whether the processing of steps S180~S240 has been completed for all of the radar objects detected in step S10. If there are any radar objects that have not yet been processed, the associating task returns to step S180, while if the processing has been completed for all of the radar objects, the associating task is ended.

3. Operation Example

Figure 8:
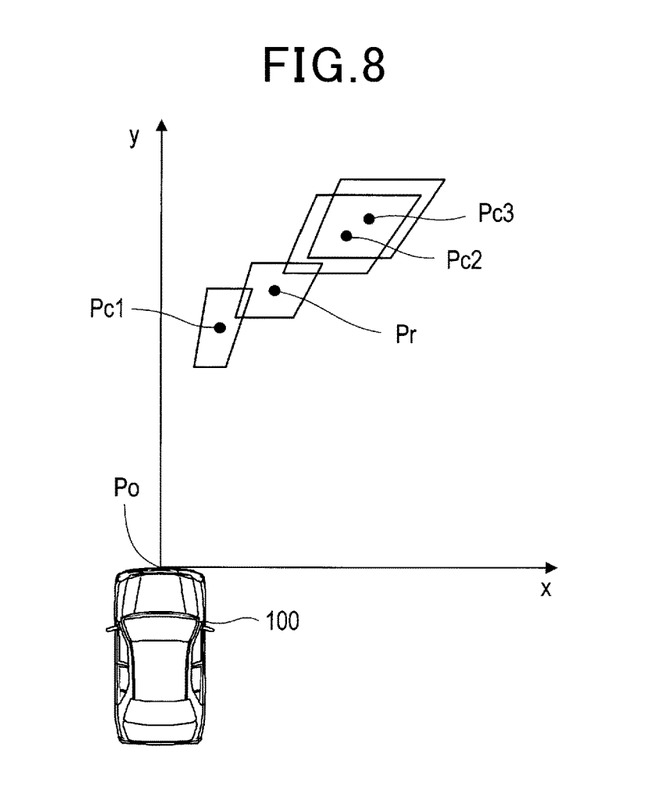
FIG. 8 is an explanatory diagram schematically illustrating an example of a state in which the collision mitigation system is operating.

As shown in FIG. 8 for example, a case can be envisaged in which a radar object (hereinafter referred to as a radar object Pr) is detected at a detection point Pr, and there are camera objects (hereinafter referred to as the camera objects Pc1~Pc3) that are detected at detection points Pc1, Pc2, Pc3. It is assumed that the camera objects Pc2 and Pc3 constitute a same camera object group, and that the detection range of the radar object Pr overlaps the detection ranges of the camera objects Pc1 and Pc2.

In step S210, if the camera object Pc1 is selected as the selected object, a one-to-one association is established with the radar object Pr, indicating that the radar object Pr and the camera object Pc1 are taken to be the same object.

On the other hand, if the camera object Pc2 is selected as the selected object in step S210, then a one-to-plurality association is established not only with the camera object Pc2 but also with the camera object Pc3, which constitutes the same camera object group as the camera object Pc2. Hence, the camera objects Pc2 and Pc3 will be taken to be the same object as the radar object Pr. Thus, if the type of the camera object Pc3, is a pedestrian, and the type of the camera object Pc2 is a cyclist, the object detection apparatus 10 maintains the information about the type of the camera object Pc1 being a pedestrian and the type of the camera object Pc2 being a cyclist at the time of executing the operation in step S210 without identifying which of the type of the camera object Pc1 and the type of the camera object Pc2 is true. That is to say, instead of discarding information relating to one of the types of the camera objects Pc1 and Pc2, the object detection apparatus 10 provides, to vehicle control routines subsequent to the object detection routine, the information for the objects associated in step S230 or S240 as associated objects.

At least one of the vehicle control routines subsequent to the object detection routine, to which the information concerning the associated objects is provided, can be configured to determine what the type of the object expressed by each associated object is in accordance with the information for the radar object Pr concerning the corresponding associated object.

Specifically, at least one of the vehicle control routines can determine what the type of each associated object is based on the information about the ground speed contained in the radar object Pr. At least one of the vehicle control routines can also determine what the type of each associated object is based on the speed vector information including the ground speed and travel direction of the radar object of the corresponding associated object.

Figure 9:
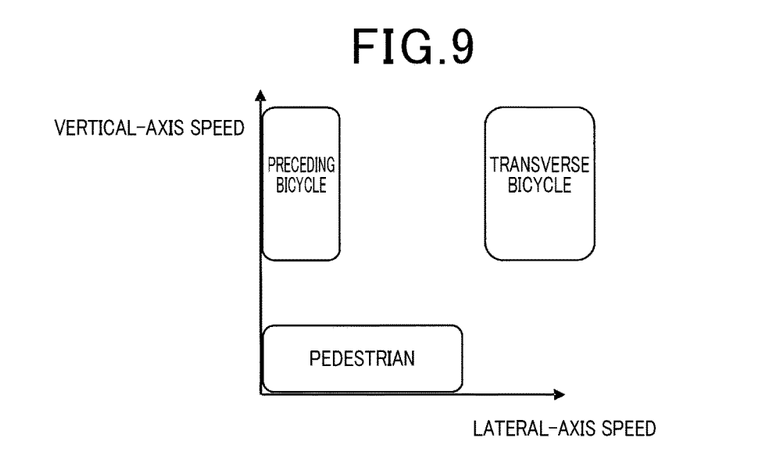
FIG. 9 is an explanatory diagram schematically illustrating an example of a method of specifying types of objects.

For example, as shown in FIG. 9, if the speed in the longitudinal direction (that is, the Y-axis direction) as specified from the speed vector of the radar object is less than a predetermined threshold value, at least one of the vehicle control routines can determine that the object expressed by an associated object is a pedestrian. Otherwise, if the speed in the vertical direction (that is, the Y-axis direction) as specified from the speed vector of the radar object is equal to or more than the predetermined threshold value, at least one of the vehicle control routines can determine that the object expressed by an associated object is a cyclist.

Moreover, at least one of the vehicle control routines can determine that the object expressed by each associated object is a preceding bicycle that is travelling ahead of the host vehicle if (1) The speed in the vertical direction is greater than or equal to the threshold value (2) The speed in the lateral direction (that is, the X axis direction) as specified from the speed vector of the radar object is less than a predetermined threshold value.

At least one of the vehicle control routines can determine that the object expressed by the associated object is a transversely moving bicycle, that is traveling laterally with respect to the host vehicle if (1) The speed in the vertical direction is greater than or equal to the threshold value (2) The speed in the lateral direction (that is, the X axis direction) as specified from the speed vector of the radar object is equal to or more than the predetermined threshold value.

The above task for identifying the type of each associated object can be carried out by an identifying unit 110 installed in the CPU 12, or installed in the collision mitigation ECU 20 (see phantom line in FIG. 1).

In addition to the identifying task executed by the identifying unit 100, at least one of the vehicle control routines can execute a sensor fusion task. The sensor fusion task is configured to fuse the respective detection points of a radar object and at least one camera object of each associated object. For example, at least one of the vehicle control routines can use the detection point of a selected one of the camera objects that constitute a camera object group as the camera object detection point for the sensor fusion task; the selected one of the camera objects has information indicative of the type of the identified object.

The above task for executing the sensor fusion task can be carried out by a fusion task execution unit 120 installed in the CPU 12, or installed in the collision mitigation ECU 20 (see phantom line in FIG. 1).

4. Effects

The following describes advantageous effects obtained by the object detection apparatus 10.

The object detection apparatus 10 is configured to associate a radar object with a plurality of camera objects that express the same object, thus holding attribute information concerning respective camera objects, such as the types of the camera objects, without losing it.

That is, as described above, if the above conventional approach recognizes a single real object as a first camera object, such as a cyclist, and a second camera object, such as a pedestrian, at almost the same position in a captured image. In this case, as described above, the conventional approach determines, for example, that the first camera object is identical to the radar object, resulting in information about the second camera object being lost.

Unfortunately, in the conventional approach, if the determination that the first camera object is identical to the radar object is erroneous, it may be difficult for the collision mitigation ECU 20 to accurately determine whether there is a possibility of the host vehicle 100 with the second camera object.

In contrast, for this case, the object detection apparatus 10 is configured to associate the radar object with the first and second camera objects that express the same object, thus holding attribute information concerning the respective first and second camera objects without losing it.

This makes it possible for the collision mitigation ECU 20 to accurately determine whether there is a possibility of the host vehicle 100 with the second camera object even if the determination that the first camera object is identical to the radar object is erroneous.

5. Other Embodiments

The present disclosure has been described with respect to the present embodiment, however the present disclosure is not limited to the present embodiment, and various types of modifications can be implemented.

The present embodiment is configured to perform the sensor fusion task after identifying the type of each associated object. The present disclosure is however not limited to the configuration. Specifically, the present disclosure can be configured to perform the sensor fusion task that fuses the respective detection points of radar objects and camera objects, and thereafter identify the types of the camera objects.

The present embodiment is configured to determine whether camera objects are the same object or whether a camera object and a radar object are the same object based on an area of overlap between overlapping regions, difference values, and distance between detection points, however the present disclosure is not limited to these. The present disclosure can be configured to use a plurality of parameters that include these parameters, for example, to evaluate the reliability of objects being the same object, and to use the evaluation results in determining whether the objects are the same object.

It would be equally possible to omit one of steps S130 and S140 of FIG. 5.

With the above embodiment, a millimeter-wave radar apparatus is used, however it would be equally possible to use an apparatus which can transmit another type of search waves (light waves, sound waves, electromagnetic waves outside the millimeter-wave range, etc), receive the reflected waves, and detect information on bodies which have reflected the scanning waves.

It would be equally possible to divide a function of a single element of the above embodiment among a plurality of components, or to use a function of a component for a plurality of components. Furthermore it would be equally possible to unify a plurality of functions of a plurality of components into a single component, or for a function that is executed by a plurality of components to be executed by a single component. It would be equally possible to omit a part of the configuration of the above embodiment. It would be equally possible for at least a part of the configuration of the above embodiment to augment or replace another part of the configuration of the embodiment. All aspects that are contained in the technical concepts specified by the wording that describes the scope of the claims constitute embodiments of the present disclosure.

Other than by the above embodiment, the present disclosure may be implemented in various forms, such as by a system having the object detection apparatus as a component, or by a program for causing a computer to function as the object detection apparatus, or a non-volatile recording medium such as a semiconductor memory or the like, in which the program is stored, or by an object detection method, etc.

What is claimed is:

1. An object detection apparatus comprising:
   a first acquisition section configured to acquire radar information that includes at least respective detection points of radar objects, the radar objects being objects detected by a radar sensor based on a detection range;
   a second acquisition unit configured to:
     perform a comparing task to compare, based on an image captured by a camera that has a capture range which overlaps at least a part of the detection range of the radar sensor, predetermined feature quantities extracted from the image with feature quantity templates;
     detect, based on a result of the comparison task, at least one object as a camera object, the feature quantity templates having been prepared beforehand for each of respective types of object to be detected; and
     acquire camera information that includes at least a detection point and type of the at least one camera object;
   a first association unit configured to associate, based on the radar information and the camera information, at least one of the radar objects with the at least one camera object upon determination that the at least one of the radar objects is estimated to be identical to the at least one camera object;
   a determination unit configured to, if a plurality of camera objects are detected so that the camera information includes at least the detection point and the type of each of the camera objects, determine whether the camera objects express a common object in accordance with the camera information; and
   a second association unit configured to:
     define, upon determination that the camera objects express the common object, the camera objects as a camera object group; and
     associate, if one of the camera objects constituting the camera object group is associated with a target radar object that is one of the radar objects, all the camera objects constituting the camera object group with the target radar object.

2. The object detection apparatus according to claim 1, further comprising:
   a region setting section configured to:
     set a first region for each of the radar objects respectively, the first region including a detection point of the radar object; and
     set a second region for each of the camera objects respectively, the second region including a detection point of the camera object,
   wherein the determination section is configured to:
     determine whether there is mutual overlap between the second regions that have been set to the respective camera objects; and
     determine that that the camera objects express the common object if there is mutual overlap between the that have been set to the respective camera objects.

3. The object detection apparatus according to claim 1, wherein:
   the camera information about each of the camera objects includes, as a determination-use information item, at least one of:
     a distance to the camera object relative to the object detection apparatus;
     a direction to the position of the camera object relative to the object detection apparatus, and
     a width of the camera object; and
   the determination unit is configured to determine that the camera objects express the common object upon determination that a difference value is less than a predetermined difference value threshold value, the difference value expressing an amount of difference between the determination-use information items of the respective camera objects.

4. The object detection apparatus according to claim 1, further comprising:
   an identifying section configured to, if a single object that is expressed by the target radar object and the camera object group is defined as an associated object, identify a type of the associated object in accordance with the radar information about the target radar object.

5. The object detection apparatus according to claim 4, wherein:
   the radar information about each radar object includes at least one of a speed and a speed vector of the radar object; and
   the identifying unit is configured to identify the type of the associated object in accordance with at least one of the speed and the speed vector of the target radar object in the associated object.

6. The object detection apparatus according to claim 4, further comprising:
   a fusion unit configured to:
     execute a sensor fusion task that fuses the detection point of the target radar object included in the associated object and the detection points of a selected one of the camera objects included in the associated object, a type of the selected one of the camera objects corresponding to the type of the associated object identified by the identifying unit.

7. An object detection apparatus comprising:
   a first acquisition section configured to acquire radar information that includes at least respective detection points of radar objects, the radar objects being objects detected by a radar sensor based on a detection range;
   a second acquisition unit configured to:
     perform a comparing task to compare, based on an image captured by a camera that has a capture range which overlaps at least a part of the detection range of the radar sensor, predetermined feature quantities extracted from the image with feature quantity templates;

detect, based on a result of the comparison task, objects as camera objects, the feature quantity templates having been prepared beforehand for each of respective types of object to be detected; and acquire camera information that includes at least a detection point and type of each of the camera objects;

a determination unit configured to determine whether the camera objects express a common object in accordance with the camera information; and an association unit configured to:

define, upon determination that the camera objects express the common object, the camera objects as a camera object group;

estimate, based on the radar information and the camera information, whether at least one of the radar objects and at least one of the camera objects are identical to each other; and associate, upon determination that the camera objects express the camera object group and that a candidate camera object that is one of the camera objects and a selected one of the radar objects have been estimated to be identical to each other, all the camera objects constituting the camera object group with the selected one of the radar objects.

8. The object detection apparatus according to claim 7, wherein:

the association unit is configured to associate the candidate camera object with the selected one of the radar objects upon determination that the camera objects do not express the camera object group and that the candidate camera object and the selected one of the radar objects have been estimated to be identical to each other, the candidate camera object with the selected one of the radar objects.

9. An object detection method comprising:

acquiring radar information that includes at least respective detection points of radar objects, the radar objects being objects detected by a radar sensor based on a detection range;

performing a comparing task to compare, based on an image captured by a camera that has a capture range which overlaps at least a part of the detection range of the radar sensor, predetermined feature quantities extracted from the image with feature quantity templates;

detecting, based on a result of the comparison task, at least one object as a camera object, the feature quantity templates having been prepared beforehand for each of respective types of object to be detected;

acquiring camera information that includes at least a detection point and type of the at least one camera object;

associating, based on the radar information and the camera information, the radar objects with the at least one camera object that are estimated to be the same as each other;

determining, if a plurality of camera objects are detected so that the camera information including at least the detection point and the type of each of the camera objects, whether the camera objects express a common object in accordance with the camera information;

defining, upon determination that the camera objects express the common object, the camera objects as a camera object group; and associating, if one of the camera objects constituting the camera object group is associated with a target radar object that is one of the radar objects, all the camera objects constituting the camera object group with the target radar object.

* * * * *